Sept. 17, 1929.   V. BENDIX   1,728,654
BRAKE SHAFT SUPPORT
Filed Dec. 29, 1926
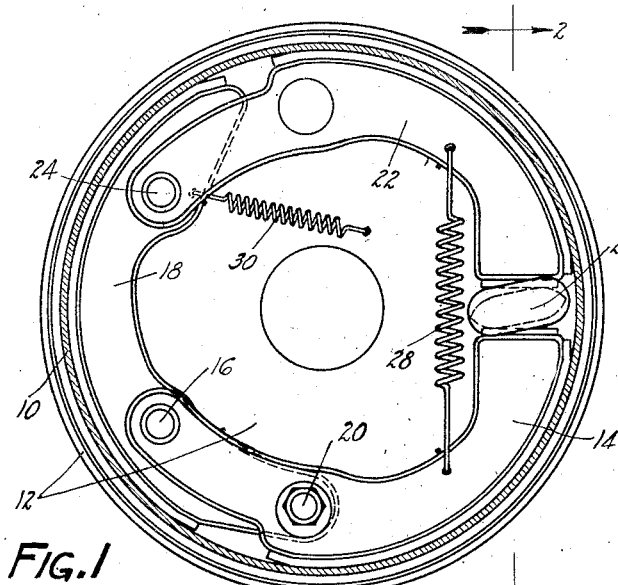
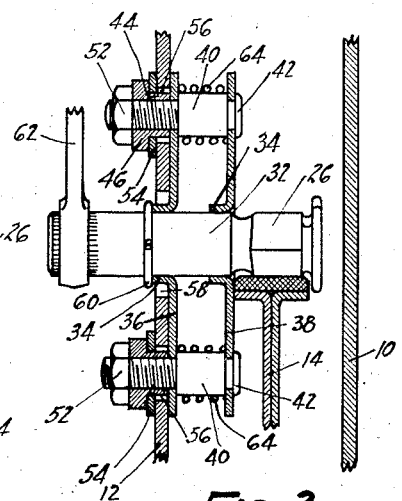
INVENTOR
VINCENT BENDIX
BY
M. W. McConkey
ATTORNEY Patented Sept. 17, 1929

1,728,654

UNITED STATES PATENT OFFICE

VINCENT BENDIX, OF CHICAGO, ILLINOIS, ASSIGNOR TO BENDIX BRAKE COMPANY, OF CHICAGO, ILLINOIS, A CORPORATION OF ILLINOIS

BRAKE-SHAFT SUPPORT

Application filed December 29, 1926. Serial No. 157,715.

This invention relates to supports for shafts and the like, and is illustrated as embodied in supports for the shafts of the cams or other operating devices for automobile brakes. An object of the invention is to provide an inexpensive but durable support, which will hold the shaft firmly, and which preferably is arranged to permit the shaft to shift bodily to center or balance the cam or its equivalent.

Each of the illustrated embodiments includes a pair of members, preferably metal stampings, providing spaced bearings for the shaft. Various features of novelty relate to supporting the members to shift with the shaft, to forming the stampings with integrally-drawn sleeves or bearings for the shaft, to an arrangement of springs to hold the entire assembly under tension, and to various desirable details of construction which will be apparent from the following description of several illustrative embodiments of the invention shown in the accompanying drawing, in which:

Figure 1 is a vertical section through the brake itself, just inside the head of the brake drum, showing the brake shoes in side elevation;

Figure 2 is a partial section through the novel shaft support, on the line 2—2 of Figure 1; and Figures 3, 4, 5, and 6 are respectively views corresponding to Figure 2, but showing modified constructions.

The brake shown in Figure 1 includes a rotatable drum 10, at the open side of which is a backing plate or other stationary support 12, and within which are arranged an auxiliary shoe 14 anchored on a pivot 16 carried by plate 12 and a secondary shoe 18 anchored on a pivot 20 and a primary shoe 22 connected to shoe 18 by a floating pivot 24.

The brake is applied by means such as a cam 26, against the resistance of a return spring 28, secondary shoe 18 being applied by the primary shoe 22 against the resistance of an auxiliary return spring 30. The particular brake illustrated is constructed substantially as more fully described in Patent No. 1,567,716, granted Bendix Brake Company on December 29, 1926, on application of A. Y. Dodge.

The present invention relates to novel means for supporting a shaft 32 for operating the cam 26 or its equivalent, whether or not used with the particular brake illustrated.

In the arrangement of Figure 2, shaft 32 is supported by integrally-drawn sleeves or bearings 34 formed in parallel members such as metal stampings 36 and 38, which are shown as being alike and interchangeable. The stampings are spaced apart by enlarged portions or collars formed on studs or posts 40 on opposite sides of shaft 32, and which are permanently secured to the stamping 38 by having their ends riveted over to form heads 42.

Stamping 36 is movably arranged on the threaded reduced-diameter ends of posts 40 and frictionally contacts the support plate 12. Nuts 46, threaded on the reduced portions of the posts, are provided with integral collars or spacers 44, washers 54 being sleeved thereover. Locknuts 52 may be provided if desired.

Nuts 46 engage washers 54 lying flat against the outer face of the backing plate 12, and cooperating with member 36 to grip plate 12 frictionally, the frictional resistance being limited by the spacers 44. The opening 58, through which passes shaft 32 and the bearing 34 formed on member 36, is also large enough to permit the described shifting of the support.

Shaft 32 may be grooved to receive a snap-ring 60 engaging the end of the bearing 34 of member 36, to prevent axial shifting of the shaft, and is shown serrated to receive an operating lever 62.

The entire support is held under spring tension, by coil springs 64 sleeved on studs 40 and confined between members 36 and 38. Springs 64 act directly on member 36, and indirectly through member 38 and studs 40 on washers 54, to urge member 36 and washers 54 yieldingly against opposite sides of plate 12.

The arrangement of Figure 3 differs from that of Figure 2 in that the member 66, corresponding to member 38, is not formed with a bearing for shaft 32, while a third member or stamping 68 engaging member 36 at its ends is formed at its center with bearing 70 for the shaft which extends in the direction of cam 26. Also the bolts 72, corresponding to studs or posts 40, have heads 74 engaging the washers 54, and have nuts 76 at their inner ends clamping member 66 against shoulders on the bolts.

In the arrangement of Figure 4, member 78, corresponding to member 38, is bent into engagement with member 36 at its ends, and springs 64 are confined between member 78 and stamped washers or stops 80 held on the ends of bolts 82 (corresponding to bolts 72) by cotter pins 84.

In Figure 5, member 86 is bent at its ends against member 36, and both of them are permanently secured to studs or bolts 88 by riveting over the ends to form heads 90. In this arrangement, nuts 92 act directly to clamp washers 54, and members 36 and 86, against opposite sides of plate 12.

In Figure 6, member 94, corresponding to member 38, is held by bolts 72 the same as member 66 in Figure 3, and there is a third member or stamping 96 lying flat against member 36 and which is also formed with a bearing 34 for shaft 32, except that the stamping 96 is turned over so that its bearing 34 extends toward cam 26.

While several illustrative embodiments have been described in detail, it is not my intention to limit the scope of the invention to those particular embodiments, or otherwise than by the terms of the appended claims.

I claim:

1. A shaft support comprising, in combination, a supporting plate provided with openings, a pair of spaced members provided with alined shaft bearings and the first of which lies along said plate, studs carried by the other of said members and passing through said first member and through the openings, means on said studs and engageable with the plate on the side opposite said first member, and coil springs sleeved on said studs and compressed between said members and urging the first member directly against the plate and acting through the other member and through the studs to urge said means against the plate.

2. A shaft support comprising, in combination, a supporting plate, a pair of spaced members provided with alined shaft bearings and the first of which lies along said plate, means engagable with the plate on the side opposite said first member, said means coupled with said members through a connection extending through the plate and including springs engaging said members and urging the first member directly against the plate and also acting to urge said means against the plate, said connection adapted to permit said members to shift as a unit with respect to the plate.

3. A shaft support comprising, in combination, a supporting plate, a pair of spaced members provided with alined shaft bearings and the first of which lies along said plate, means engageable with the plate on the side opposite said first member, said means coupled with said members through a connection extending through the plate and including springs engaging said members and urging the first member directly against the plate and also acting to urge said means against the plate, the spaced members being shiftable with respect to the plate but normally frictionally held in place by said springs.

4. A support comprising, in combination, a plate formed with an opening, a pair of spaced supporting members, a stud carried by one of said members and passing through the other and through the opening, means at the end of the stud frictionally engaging the plate opposite the other of said members, and a coil spring sleeved on the stud and confined between said members to hold at least one member and said means frictionally against the opposite sides of the plate to position the supporting members with respect thereto while permitting resisted bodily shifting movement thereof with respect to the plate.

5. A support comprising, in combination, a plate formed with an opening, a pair of supporting members arranged upon one side of the plate, a stud engaging said members and passing through the opening, means at the end of the stud engaging the plate upon the side opposite said members, and a coil spring sleeved on the stud and exerting pressure thereupon holding said means frictionally against one side of the plate and one of said members frictionally against the opposite side of the plate to adjustably position the said members with respect to the plate while permitting resisted shifting movement thereof as a unit over the plate.

6. A shaft support comprising, in combination, a pair of stampings formed with coaxial integrally-drawn sleeves forming bearings in which the shaft may be directly journalled, a stationary support, and spaced tensioned fastenings securing said stampings upon one side of the stationary support in frictional engagement therewith whereby they may be shifted resistingly bodily as a unit thereover.

7. A shaft support comprising, in combination, a pair of stampings formed with coaxial integrally-drawn sleeves forming bearings in which the shaft may be directly journalled, a stationary support, and means holding said stampings in abutment and frictionally against one side of the stationary support to position the same with respect to the support while permitting resisted bodily shifting of the stampings as a unit over said support while preventing relative shifting of said stampings with respect to each other.

8. A shaft support comprising, in combination, a pair of stampings formed with coaxial integrally-drawn sleeves forming bearings in which the shaft may be directly journalled, a stationary support formed with an opening through which one of said sleeves extends, and means for mounting the stampings on said support in a manner permitting them to shift as a unit when sufficient force is applied.

9. A shaft support comprising, in combination, a plate, a pair of stampings arranged back to back in frictional abutment with one side of the plate and formed with oppositely-extending coaxial integrally-drawn sleeves in which the shaft may be directly journalled, and means holding the two stampings as a unit against one side of the plate in a manner permitting them to shift as a unit.

10. A shaft support comprising, in combination, a pair of stampings formed with coaxial integrally-drawn sleeves in which the shaft may be directly journalled, a third stamping having an integrally-drawn sleeve coaxial with respect to said first sleeves, and means for supporting the three stampings as a unit in a manner permitting them to shift as a unit.

11. A shaft support comprising, in combination, two stampings spaced apart at least at their centers and there formed with coaxial integrally-drawn sleeves in which the shaft may be directly journalled, a supporting plate having a shaft opening arranged opposite said sleeves, fastening devices securing said stampings together and to the plate in such a manner as to permit resisted bodily shifting of the stampings as a unit over the plate.

12. A shaft support comprising, in combination, two stampings spaced apart throughout and formed between their ends with coaxial integrally-drawn sleeves in which the shaft may be directly journalled, a plate having a shaft opening arranged opposite the shaft openings through the sleeves and fastening devices holding said stampings together in spaced apart relationship and securing them frictionally as a unit against one side of the plate in such a manner as to permit resisted bodily shifting of the stampings over the plate.

13. A shaft support comprising, in combination with a stationary plate having a shaft opening, a pair of stampings shaped to provide a shaft bearing of substantially greater width than their combined thickness, and means securing said stampings as a unit upon one side of the plate with their shaft bearing positioned opposite the opening through the plate in such a manner as to permit resisted bodily shifting of the stampings as a unit with respect to the plate.

14. A shaft support comprising, in combination with a stationary plate having a shaft opening, a pair of stampings shaped to provide a shaft bearing of substantially greater width than their combined thickness, said bearing extending at one end into the opening of the plate and means extending through the stampings and the plate securing the stampings together and holding them frictionally as a unit against one side of the plate while permitting resisted bodily shifting of the same as a unit over the plate.

15. A shaft support comprising, in combination with a stationary plate having an oversize shaft opening, a plurality of metal stampings arranged in abutment and in spaced apart relationship and provided with integrally formed aligned sleeves adapted to serve as a shaft bearing, securing means holding said stampings together and holding them as a unit frictionally against one side of the plate with their shaft bearing arranged opposite the opening through the plate and in such a manner as to permit bodily shifting of the stampings as a unit with respect to the plate.

16. A shaft support comprising, in combination with a stationary plate having an oversize shaft opening, a plurality of shaft supporting members provided with aligned integral shaft bearing portions of substantially greater combined width than the combined thickness of said members, means holding said members yieldingly frictionally against one side of the plate with the shaft bearings arranged opposite the opening through the plate, and a stub shaft extending through the plate and mounted in said bearings provided with a torque applying part adjacent one end upon one side of the plate and a torque transmitting part adjacent the other end upon the opposite side of the plate.

17. A shaft support comprising, in combination with a stationary plate having an oversize shaft opening, three juxtaposed stampings provided with aligned integral bearing sleeves arranged upon one side of the plate with the sleeve of one stamping extending into the opening of the plate, and means holding said stampings together as a unit and yieldingly frictionally against one side of the plate permitting resisted bodily shifting of the stampings as a unit with respect to the plate.

In testimony whereof, I have hereunto signed my name.

VINCENT BENDIX.